US007935162B2

(12) United States Patent
Hyun et al.

(10) Patent No.: US 7,935,162 B2
(45) Date of Patent: May 3, 2011

(54) DUST COLLECTING DEVICE FOR VACUUM CLEANER

(75) Inventors: Kie Tak Hyun, Changwon-si (KR); Young Bok Son, Changwon-si (KR); Kyeong Seon Jeong, Changwon-si (KR); Il Joong Kim, Gyeongsangnam-do (KR); Sung Hwa Lee, Changwon-si (KR)

(73) Assignee: LG Electronics Inc., Seoul (KR)

( * ) Notice: Subject to any disclaimer, the term of this patent is extended or adjusted under 35 U.S.C. 154(b) by 311 days.

(21) Appl. No.: 11/990,511

(22) PCT Filed: Aug. 17, 2005

(86) PCT No.: PCT/KR2005/002689

§ 371 (c)(1),
(2), (4) Date: Apr. 3, 2009

(87) PCT Pub. No.: WO2007/021044

PCT Pub. Date: Feb. 22, 2007

(65) Prior Publication Data

US 2009/0211212 A1 Aug. 27, 2009

(51) Int. Cl.
*B01D 45/12* (2006.01)

(52) U.S. Cl. ................ 55/343; 55/349; 55/423; 55/429; 55/433; 55/459.1; 55/DIG. 3

(58) Field of Classification Search .................... 55/343, 55/346, 349, 423, 433, 429, 459.1, DIG. 3; 15/350, 353

See application file for complete search history.

(56) References Cited

U.S. PATENT DOCUMENTS

| | | | | |
|---|---|---|---|---|
| 5,062,870 | A | 11/1991 | Dyson | |
| 5,090,976 | A | 2/1992 | Dyson | |
| 6,835,222 | B2 * | 12/2004 | Gammack | 55/345 |
| 7,771,499 | B2 * | 8/2010 | Oh et al. | 55/343 |
| 2001/0054213 | A1 | 12/2001 | Oh et al. | |
| 2005/0172585 | A1 | 8/2005 | Oh et al. | |
| 2005/0172586 | A1 | 8/2005 | Oh et al. | |
| 2007/0095029 | A1 * | 5/2007 | Min et al. | 55/345 |

FOREIGN PATENT DOCUMENTS

| | | |
|---|---|---|
| CN | 1394126 | 1/2003 |
| CN | 1425352 | 6/2003 |
| CN | 1606952 | 4/2005 |
| CN | 1654002 | 8/2005 |
| EP | 0728435 | 8/1996 |
| GB | 2 360 719 | 10/2001 |
| GB | 2 406 067 | 3/2005 |
| KR | 10-2005-0080916 | 8/2005 |

* cited by examiner

*Primary Examiner* — Robert A Hopkins
(74) *Attorney, Agent, or Firm* — McKenna Long & Aldridge LLP

(57) ABSTRACT

Object of the present invention is to provide a dust collecting device (10) for a vacuum cleaner of the dust collecting performance is improved. For this, a dust collecting device (100) for a vacuum cleaner is provided, including a primary cyclone unit (200) for separating dust by a cyclone principle, a secondary cyclone unit (300) around the primary cyclone unit (200) for separating dust from air discharged from the primary cyclone unit (200) by the cyclone principle, a primary dust container (111) for storing the dust separated at the primary cyclone unit (200), and a secondary dust container (112) in the primary dust container (111) for storing the dust separated at the secondary cyclone unit (300).

15 Claims, 5 Drawing Sheets

[Fig. 1]
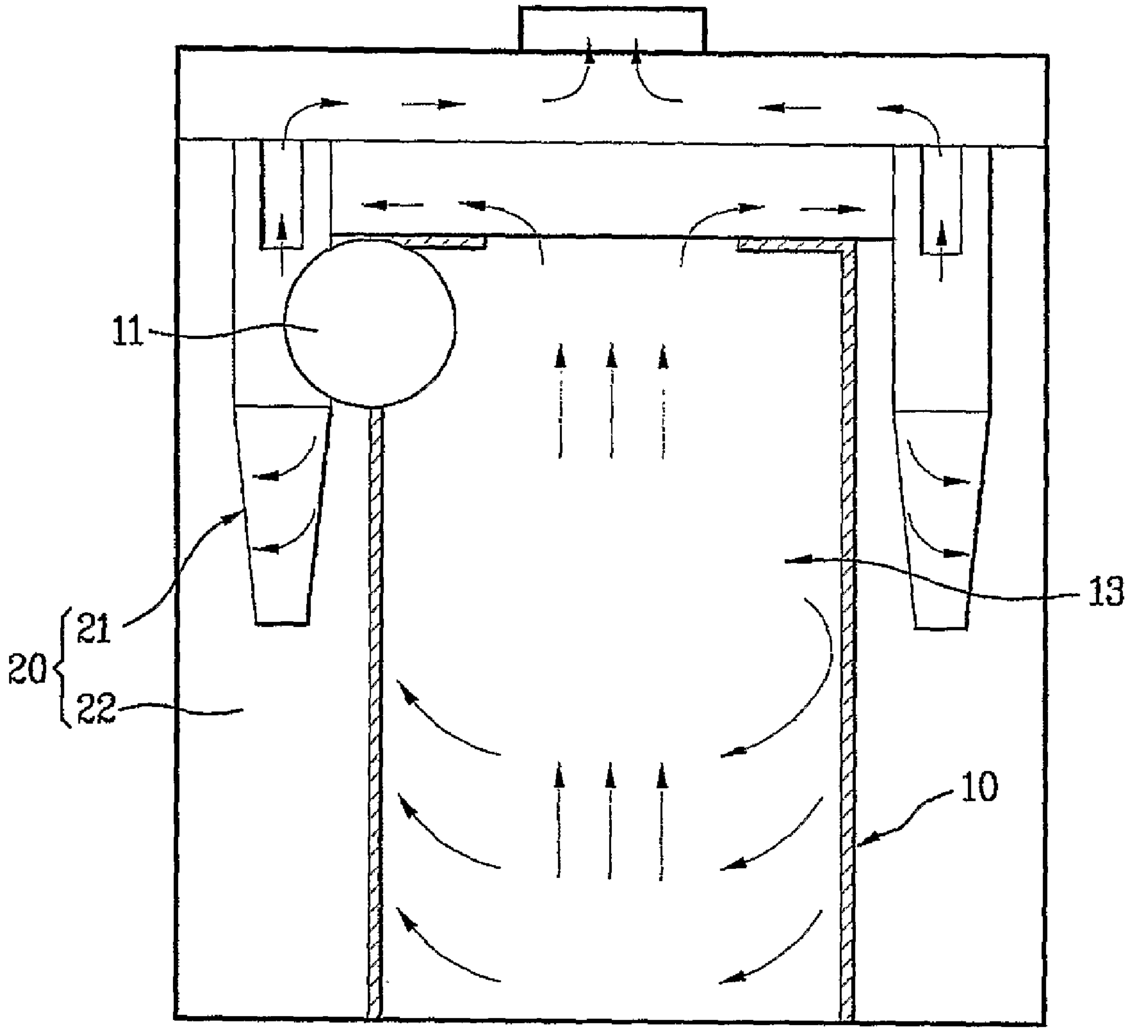

[Fig. 2]
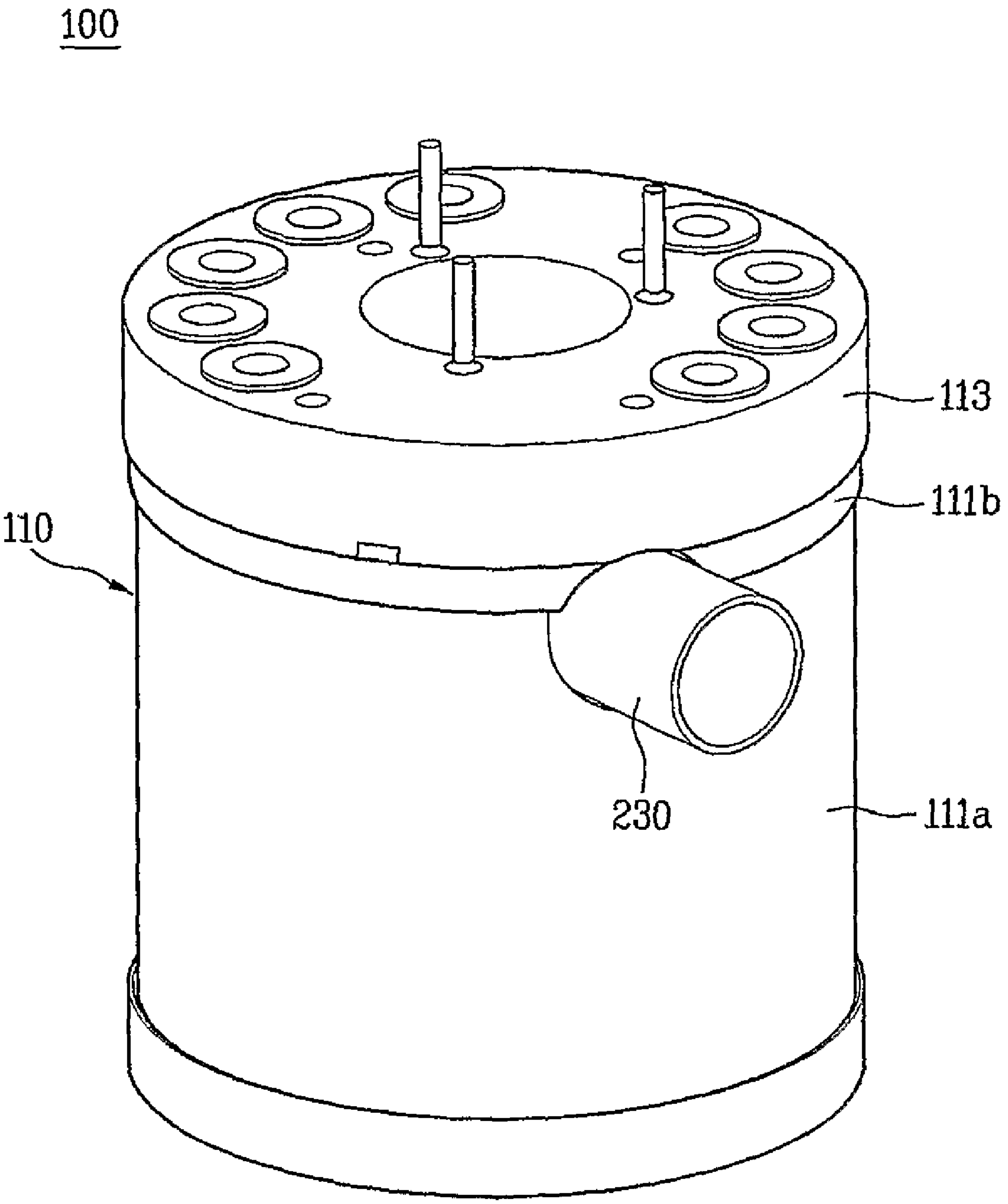

[Fig. 3]
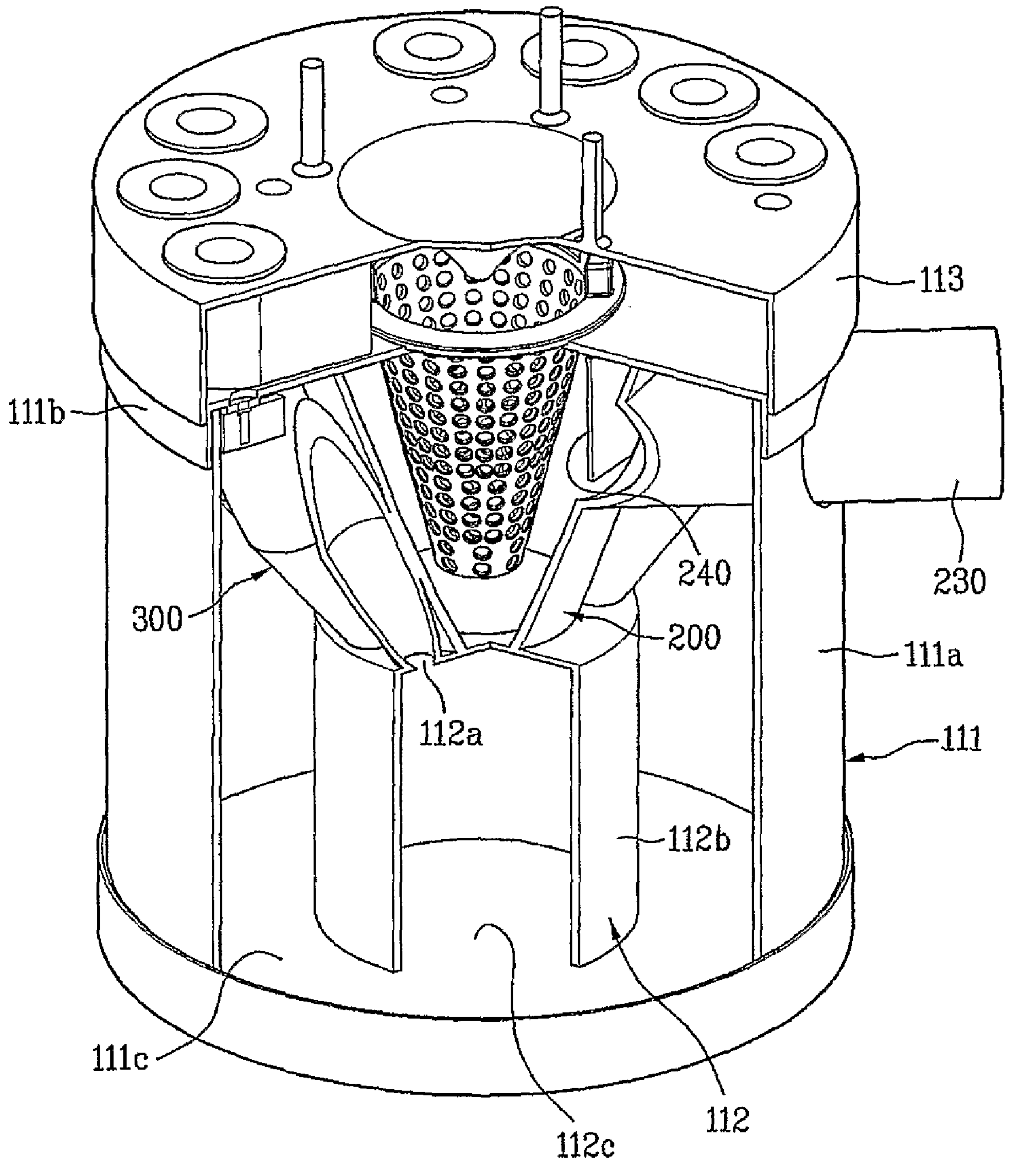

[Fig. 4]
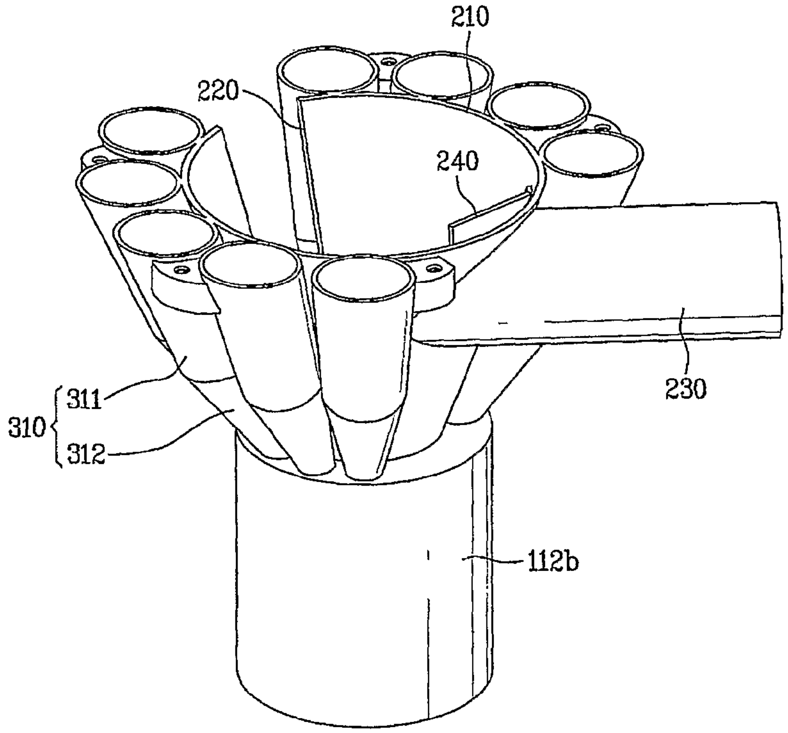
[Fig. 5]
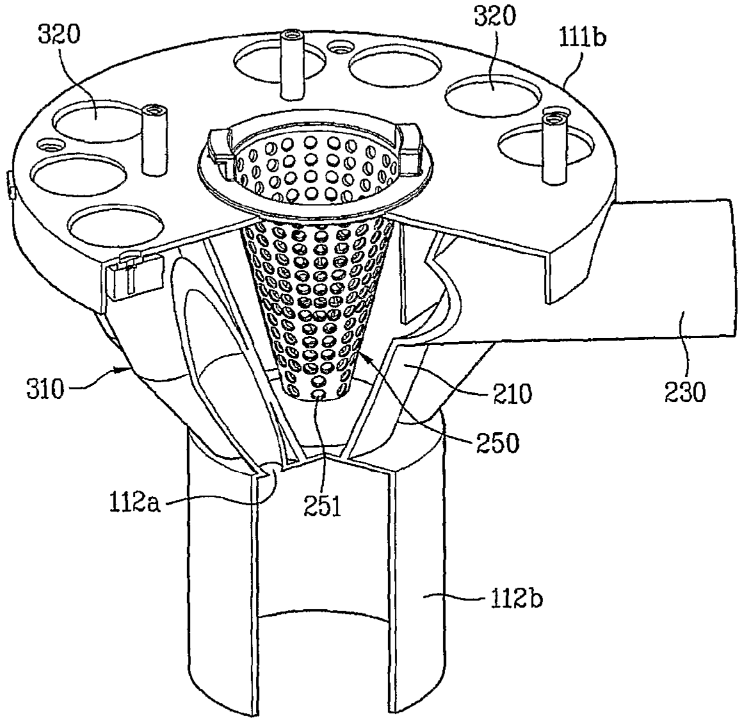

[Fig. 6]
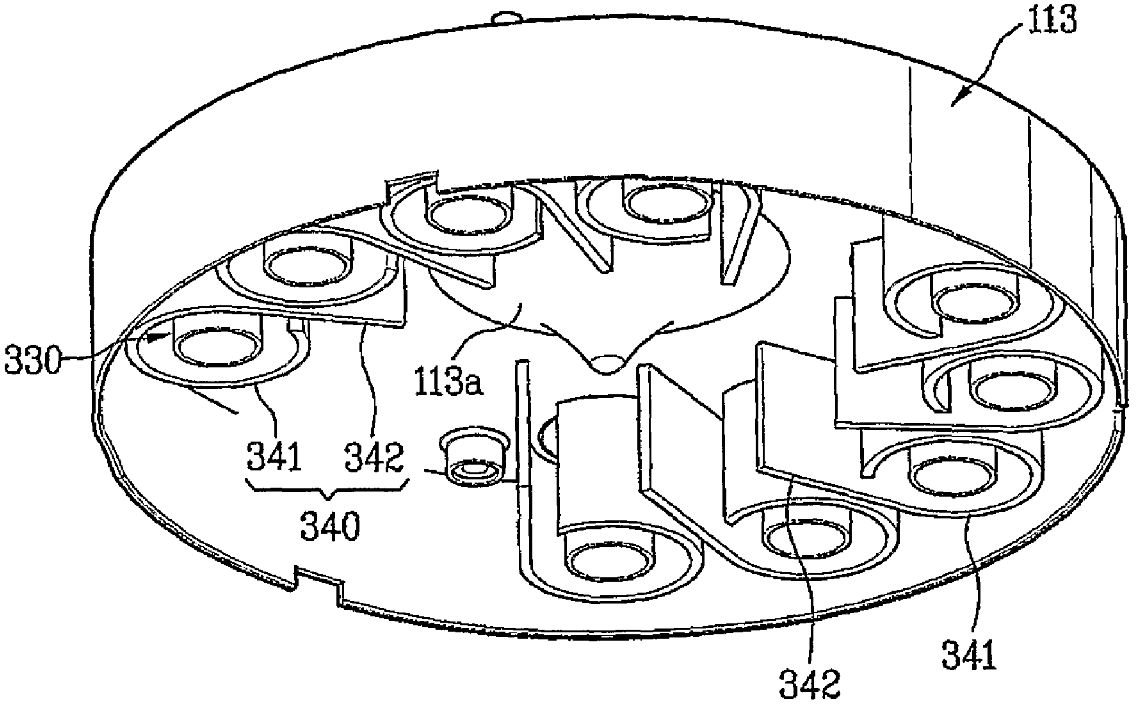

DUST COLLECTING DEVICE FOR VACUUM CLEANER

This application claims the benefit of PCT Patent Application No. PCT/KR2005/002689, filed Aug. 17, 2005, which is hereby incorporated by reference in its entirety.

TECHNICAL FIELD

The present invention relates to a dust collecting device for a vacuum cleaner, and more particularly, to a dust collecting device for a vacuum cleaner which collects dust by a cyclone principle.

BACKGROUND ART

In general, the cyclone dust collecting device is applied to a vacuum cleaner, for separating foreign matters, such as dust, from circulating air, to collect the dust.

The cyclone principle utilizes a difference of centrifugal forces for separating foreign matters, such as dust, from air circulating in a spiral.

Recently, the cyclone dust collecting device, collecting dust by using, the cyclone principle, is generally applied to the vacuum cleaner owing to advantages of the cyclone dust collecting device in that dust collecting performance is good and dust can be removed easily compared to a bag-type dust collecting device in which a dust bag is mounted in an air flow passage for collecting dust.

A related art dust collecting device for a vacuum cleaner will be described with reference to FIG. 1.

The related art dust collecting device is provided with a primary cyclone dust collecting unit 10 for drawing contaminated air containing dust and collecting comparatively large sized particles of the dust therefrom, and a secondary cyclone dust collecting unit 20 on an outside of the primary cyclone dust collecting unit 10 for collecting comparatively small sized particles of the dust.

The primary cyclone dust collecting unit 10, a cylindrical container having a bottom in close contact with a bottom of the dust collecting device, has a suction pipe 11 in a side surface of an upper portion for introduction of contaminated air containing foreign matters in a tangential direction of ah inside wall of the primary cyclone dust collecting unit, and a discharge opening 12 at a center of a top for discharging air cleaned primarily.

According to this, the primary cyclone dust collecting unit 10 has an upper space forming a primary cyclone 13 for separating foreign matters by centrifugal force, and a lower space forming a primary dust storage portion 14 for storing foreign matters separated by the centrifugal force.

In the meantime, the air from the discharge opening 12 is introduced to the secondary cyclone dust collecting unit 20, and discharged upward after passed through a dust separating step, again.

In more detail, the secondary cyclone dust collecting unit 20 includes a plurality of small sized secondary cyclones 21 arranged in a circumferential direction around the upper portion of the primary cyclone dust collecting unit 10, and a secondary dust storage portion 22 for storing dust separated at the secondary cyclone dust collecting unit 21.

The secondary dust storage portion 22 is under the secondary cyclones 21 around the primary dust storage portion. The primary dust storage portion 14 and the secondary dust storage portion 22 are separated by an outside wall of the primary cyclone dust collecting unit 10.

However, Because the primary cyclone and the primary dust storage portion are formed, as one unit in the cylindrical primary cyclone dust collecting unit having, the same upper and lower inside diameters, the dust flies up from the primary dust storage portion toward an upper side of the primary cyclone by the spiral circulation of air in the primary cyclone, thereby leading the dust collecting performance poor.

Moreover, in the related art dust collecting device, because the secondary dust collecting portion is around the primary dust collecting portion, if a capacity of the primary dust storage portion is made greater, a width of the secondary dust storage portion becomes smaller, causing difficulty both in removal of foreign matters from a wall of the secondary dust storage portion, and checking an amount of dust accumulated in the primary dust storage portion due to the secondary dust storage portion that shades the primary dust storage portion.

DISCLOSURE OF INVENTION

Technical Problem

An object of the present invention is to provide a dust collecting device for a vacuum cleaner, which has an improved dust collecting performance.

Technical Solution

The object of the present invention can be achieved by providing a dust collecting device for a vacuum cleaner including a primary cyclone unit for separating dust by a cyclone principle, a secondary cyclone unit around the primary cyclone unit for separating dust from air discharged from the primary cyclone unit by the cyclone principle, a primary dust container for storing the dust separated at the primary cyclone unit, and a secondary dust container in the primary dust container for storing the dust separated at the secondary cyclone unit.

The primary cyclone unit includes a primary cyclone container having a bottom end sectional area smaller than a top end sectional, area, along an inside circumferential surface of which spiral circulation is formed, and a primary dust outlet in the primary cyclone container for discharging the dust to the primary dust container.

The primary cyclone container has a cross sectional area which becomes the smaller as it goes toward a bottom end the more.

The primary dust outlet is formed passed through a circumferential wall of the primary cyclone container, for discharging the dust from the primary cyclone container to the primary dust container by centrifugal force.

The primary dust outlet is extended from a top end to a bottom end of the primary cyclone container in an up/down direction.

The secondary cyclone unit includes a plurality of small sized cyclones arranged in a circumferential direction on an outer circumference of the primary cyclone container.

Preferably, the small sized cyclones are arranged such that a space between bottom ends is smaller than a space between top ends.

In more detail, the small sized cyclones are provided tilted on the outer side of the primary cyclone container such that a radius of a circle connecting top centers of the small sized cyclones is greater than a radius of a circle connecting bottom centers of the small sized cyclones.

Each of the small sized cyclones includes a cylindrical body, and a supplementary body under the body, having a cross sectional area which becomes the smaller as it goes toward a bottom end the more.

Preferably, the primary cyclone container has a cup shape with a cross sectional area which becomes the smaller gradually as it goes toward a bottom end the more, and outside circumferential surfaces of the body and the supplementary body are in contact with an outside circumferential surface of the primary cyclone container such that the supplementary body is bent toward the primary cyclone container with respect to the body.

In the meantime, the primary dust container may surround the secondary cyclone unit.

The secondary dust container is connected to the bottom ends of the small sized cyclones, provided to a lower center of the primary dust container, and has a dust inlet at a top circumference thereof for receiving dust separated at the small sized cyclones.

The primary dust container is formed as one body with a bottom of the secondary dust container, and includes an openable bottom.

Preferably, the secondary cyclone unit and the primary cyclone unit are formed as one body.

Preferably, the primary dust container is openably provided to a top end of an outside wall of the primary dust container, and includes an upper cover to which the secondary cyclone unit and the primary cyclone unit are connected.

Advantageous Effects

The provision of the secondary dust container, which stores dust separated at the secondary cyclone unit, in the primary dust container, which stores dust separated at the primary cyclone unit, permits to maximize a dust collecting capacity of the primary dust container, and to clean the secondary dust container easily.

BRIEF DESCRIPTION OF THE DRAWINGS

The accompanying drawings, which are included to provide a further understanding of the invention, illustrate embodiment(s) of the invention and together with the description serve to explain the principle of the invention. In the drawings;

FIG. 1 illustrates a section of a related art cyclone dust collecting device;

FIG. 2 illustrates a perspective view of a dust collecting device in accordance with a preferred embodiment of the present invention;

FIG. 3 illustrates a partial cut away perspective view of a dust collecting device in accordance with a preferred embodiment of the present invention;

FIG. 4 illustrates a perspective view of primary, and secondary cyclone units of a dust collecting device in accordance with a preferred embodiment of the present invention;

FIG. 5 illustrates a partial cut away perspective view showing the primary, and secondary cyclone units of a dust collecting device in FIG. 4 with an upper cover placed thereon; and FIG. 6 illustrates a perspective view of a cap of a dust collecting device in accordance with a preferred embodiment of the present invention.

BEST MODE FOR CARRYING OUT THE INVENTION

Reference will now be made in detail to the preferred embodiments of the present invention, examples of which are illustrated in the accompanying drawings. Wherever possible, the same names and reference numbers will be used throughout the drawings to refer to the same or like parts, and repetitive description of which will be omitted.

As one embodiment of a vacuum cleaner having a dust collecting device in accordance with a preferred embodiment of the present invention applied thereto, a canister type vacuum cleaner will be described.

The vacuum cleaner includes a suction nozzle for drawing air containing foreign matters while moving along a floor to be cleaned a cleaner body provided separate from the suction nozzle, and a connection pipe connected between the suction nozzle and the cleaner body for guiding contaminated air from the suction nozzle to the cleaner body.

The suction nozzle, has a predetermined size of nozzle suction opening in a bottom for drawing dust from the floor by air suction force generated at the cleaner body.

Mounted inside of the cleaner body, there are an electric unit for controlling the vacuum cleaner, and a motor-fan assembly for drawing air.

In more detail, the cleaner body has a hose connection portion at a front upper center for connecting the connection pipe thereto, wheels rotatably mounted at opposite sides of a rear of the cleaner body for smooth moving of the cleaner body on the floor, and a caster at a front portion of a bottom of the cleaner body, for changing a direction of the cleaner body.

In the meantime, the cleaner body has the dust collecting device in accordance with a preferred embodiment of the present invention detachably mounted thereto for separating and collecting foreign matters, such as dust.

Air from the dust collecting device passes a predetermined air discharge passage in the cleaner body, and the motor-fan assembly, and is discharged to an outside of the cleaner body.

The dust collecting device may be mounted to a rear portion of the cleaner body or a front portion of the cleaner body.

For this, the cleaner body has a dust collecting device mounting portion at the front portion or rear portion of the cleaner body for mounting the dust collecting device.

Between the hose connection portion and the dust collecting device mounting portion, there is a suction passage passed through the upper portion of the cleaner body in a front/rear direction for guiding the air containing dust.

The dust collecting device 100 in accordance with a preferred embodiment of the present invention will be described with reference to a case the dust collecting device is mounted to the rear portion of the cleaner body.

FIG. 2 illustrates a perspective view of a dust collecting device in accordance with a preferred embodiment of the present invention, and FIG. 3 illustrates a front view of a dust collecting device in accordance with a preferred embodiment of the present invention.

Referring to FIGS. 2 and 3, the dust collecting device includes a primary cyclone unit 200 and a secondary cyclone unit 300 for separating dust by a cyclone principle, and a dust container 110 for storing dust separated by the primary, and secondary cyclone units.

The dust container 110 includes a primary dust container 111 for storing dust separated at the primary cyclone unit 200, and a secondary dust container 112 for storing dust separated at the secondary cyclone unit 300.

In the dust collecting device 100 of the present invention, the secondary dust container 112 is provided in the primary dust container 111, in a fashion to maximize a dust storage capacity of the primary dust container 111.

In the embodiment, though it is preferable that the primary dust container 111, and the secondary dust container 112 have substantially cylindrical shapes respectively, the shapes of the primary dust container 111, and the secondary dust container 112 are not limited to the cylindrical shapes.

In more detail, the primary dust container 111 forms an exterior of the dust collecting device in accordance with a preferred embodiment of the present invention, having the primary cyclone unit 200 and the secondary cyclone unit 300 provided therein.

The primary dust container 111 includes a cylindrical dust container body 111*a* with an opened top, and an upper cover 111*b* for covering a top of the dust container body 111*a*.

It is preferable that the upper cover 111*b* is openably provided to a top end of an outside wall of the primary dust container 111, i.e., to a top end of the dust container body 111*a*.

In the dust collecting device of the present invention, the primary cyclone unit 200 includes a primary cyclone container 210 and a primary dust outlet 220 in the primary cyclone container 210.

Referring to FIGS. 3 to 5, mounted to an upper outside circumferential surface of the primary cyclone container 210, there is a suction pipe 230 for guiding the air containing dust to an inside of the primary cyclone container 210.

The suction pipe 230 is connected to a suction flow passage of the cleaner body in a state the dust collecting device 100 of the present invention is mounted to the cleaner body.

On an inside circumferential surface of the primary cyclone container 210, there is a guide rib 240 for guiding the air guided by the suction pipe 230 to the inside circumferential surface of the primary cyclone container 210.

The suction pipe 230 and the guide rib 240 form a spiral air flow along the inside circumferential surface of the primary cyclone container 210, for separating dust owing to a centrifugal force difference between the air and the dust.

It is preferable that the primary cyclone container 210 has a sectional area of a bottom end smaller than a sectional area of a top end.

In the embodiment, the primary cyclone container 210 has the sectional area which becomes the smaller gradually as it goes from the top end to the bottom end the more.

Accordingly, the primary cyclone container 210 has ah outside circumferential surface sloped inwardly as it goes to a lower side the more, to increase or maintain centrifugal force of the air introduced into the primary cyclone container 210 through the suction pipe 230 as the air goes toward the lower side of the primary cyclone container 210.

The primary dust outlet 220 serves to discharge dust from the primary cyclone container 210 to the primary dust container 111.

In more detail, the primary dust outlet 220 is formed passed through a circumferential wall of the primary cyclone container 210, i.e., an outside circumferential surface.

Accordingly, the dust circulating in a spiral in the primary cyclone container 210 is discharged to the primary dust container 111 by the centrifugal force, leading to minimize dust laden on an air flow discharged from the primary cyclone container 210 to the secondary cyclone unit 300.

It is preferable that the primary dust discharge outlet 220 is extended from a top end to a bottom end of the primary cyclone container 210 in an up/down direction, for maximizing a dust separating performance at the primary cyclone unit 200.

In the meantime, it is preferable that the secondary cyclone unit 300 includes a plurality of small sized cyclones 310 arranged on an outside circumference of the primary cyclone container 210 in a circumferential direction.

The small sized cyclones 310 are arranged such that a space between top ends is smaller than a space between bottom ends of the small sized cyclones 310.

In more detail, the small sized cyclones 310 are provided tilted on the outer side of the primary cyclone container 210 such that a radius of a circle connecting top centers of the small sized cyclones 310 is greater than a radius of a circle connecting bottom centers of the small sized cyclones 310.

In other words, the small sized cyclones 310 are provided tilted on the outer side of the primary cyclone container 210 such that axes of the small sized cyclones 310 become the closer to one another as the axes go to a lower side the more.

In the embodiment, each of the small sized cyclones 310 includes a cylindrical body 311, and a supplementary body 312 on an underside of the body 111.

It is preferable that the supplementary body 312 has a cone shape substantially with a lower portion cut away and a sectional area which becomes the smaller as it goes toward me bottom end the more.

According to this, by preventing interference between lower portions of the small sized cyclones 310 in a process spaces between the lower portions of the small sized cyclones 310 becomes closer in arranging the small sized cyclones 310 to surround the outside circumference of the primary cyclone container 210, a number of the small sized cyclones 310 can be maximized.

Moreover, the supplementary body 312 is bent toward the primary cyclone container 210 with respect to the body 311, such that outside circumferential surfaces of the body 311 and the supplementary body 312 are in contact with an outside circumferential surface of the primary cyclone container 210.

For this, the outside circumferential surface of the body 311 is in contact with the outside circumferential surface of the primary cyclone container 210 from a top end to a bottom end to form a straight upper contact surface parallel to the axis of the body 311.

The supplementary body 312 is formed as one body with the body 311 at a bottom end thereof, with the outside circumferential surface in contact with the outside circumferential surface of the primary cyclone container 210 starting from the top end to the bottom end of the supplementary body 312, to form a lower contact surface in a straight line of the upper contact surface.

In the embodiment, the top end of the body 311 forms a top end of the small sized cyclone 310, and the bottom end of the supplementary body 312 forms a bottom end of the small sized cyclone 310.

According to this, an axis of the small sized cyclone is composed of an upper axis with a steep slope, and a lower axis crossed with the upper axis, with a moderate slope compared to the upper axis.

In the dust collecting device 100 of the present invention, the primary dust container 111 is configured to surround the secondary cyclone unit 300, and stores dust separated by the primary cyclone unit 200.

Therefore, because the dust circulating in a spiral in the primary cyclone container 210 spreads toward an inside circumferential surface of the primary dust container 111 by centrifugal force, the dust laden on the circulating air discharged from the primary cyclone container 210 to the secondary cyclone unit 30 is minimized.

More preferably, a circumferential wall of the primary dust container 111, i.e., a circumferential wall of the dust container body 111*a* is parallel to the axis of the primary cyclone container 210, to surround the small sized cyclones 310.

According to this, since a gap between the small sized cyclones 310 and the inside circumferential surface of the primary dust container 111, i.e., the dust container body 111*a*, becomes the greater as it goes toward a lower side of the small sized cyclones 310 the more, a volume of the primary dust container 111 can be maximized.

The secondary dust container 112 is connected to the bottom ends of the small sized cyclones 310, provided to a lower center of the primary dust container 111, and has a dust inlet at a top circumference thereof for receiving dust separated at the small sized cyclones.

In more detail, the top circumference of the secondary dust container 112 is a bottom of the primary cyclone container, and the dust inlet includes a plurality of dust inlets 112*a* formed along a top circumference of the secondary dust container 112 in correspondence to the small sized cyclones 310.

The secondary dust container 112 includes a cylindrical container portion 112*b* of a circumferential wall and top of the secondary dust container, and a bottom 112*c* which closes a bottom of the container portion 112*b*.

It is preferable that the container portion 112*b* of the secondary dust container is formed as one body the small sized cyclones.

It is preferable that a bottom 111*c* of the primary dust container is formed as one body with the bottom 112*c* of the secondary dust container, to form a bottom of the dust container body 111*a*. It is preferable that the bottom of the dust container body 111*a* can be opened/closed for removing dust from the primary dust container 111 and the secondary dust container 112.

Moreover, it is preferable that, in order to determine an amount of dust in the primary dust container 111, an outside wall of the dust container body 111*a* is formed of a material which can be see-through. Of course, it is preferable that an outside wall 112*b* of the secondary dust container is also formed of a material which can be see-through.

If it is assumed that the primary dust container 111 has a radius R1, the secondary dust container 112 has a radius R2, and the primary cyclone container 210 has a top end radius R3, it is preferable that R1, R2, and R3 have a relation expressed as the following equation.

$$R1^2 - R2^2 > R3^2 \quad (1)$$

According to this, even if a total volume of the dust container 110 is the same with the related art, and a top end diameter of the primary cyclone container 210 and a top end diameter of the small sized cyclone 310 are the same with the related art, a lower volume of the primary dust container 111 can be increased more, and the cylindrical shape of the secondary dust container 112 enables easy cleaning of the secondary container 112.

The air cleaned at the primary cyclone container 210 primarily is discharged upward through the top end of the primary cyclone container 210.

The small sized cyclones 310 separate fine dust not separated at the primary cyclone unit 200, and the air cleaned at the small sized cyclones 310 secondarily is discharged to an upper side of the small sized cyclones 310.

For this, at a center of the upper cover 111*b* provided to an upper side of the primary cyclone container 210, there is a primary air outlet (not shown) for discharging the air primarily cleaned at the primary cyclone container 210.

It is preferable that a hollow air discharge member 250 is provided in an up/down direction in the primary cyclone container 210.

In more detail, the air discharge member 250 has an outside circumferential surface with pass through holes 251 of predetermined sizes formed therein for discharging air, and a top end detachably connected to a circumference to the primary air discharge opening, with an opening for enabling the air discharge.

The air discharge member may have a cylindrical shape, or a cup shape having a cross section area which becomes the smaller as it goes toward a lower side.

In a periphery of the upper cover 111*b*, there are a plurality of secondary air outlets 320 in correspondence to the small sized cyclones 310.

In addition to this, it is preferable that a cap 113 is provided for covering the upper cover 111*b*.

Referring to FIG. 6, the cap 113 forms an air flow chamber so that the air discharged upward through the upper cover 111*b* from the primary cyclone unit 200 flows toward the secondary cyclone unit 300.

It is preferable that the cap 113 is detachably mounted to the upper cover 111*b*.

Though not shown, it is preferable that the dust container 110 includes an air discharge cover provided on the cap 113 for collecting air from the secondary cyclone unit 300 and discharging the air to an air discharge flow passage of the cleaner body.

It is preferable that the cap 113 has a guide member at a center for spreading the air discharged upward through the primary air discharge outlet in a radial direction.

It is preferable that the guide member 113*a* is projected downward from the center of the cap 113, and has a cone shape with a cross sectional area which goes the smaller as it goes to a lower side the more.

At a periphery of the cap 113, there are a plurality of air discharge pipes 330 provided in up/down direction in correspondence to the secondary, air outlets 320 for guiding the air discharged upward from the small sized cyclones 310 to an upper side of the cap 113.

Moreover, on an underside of the cap 113, there are a plurality of spiral guides 340 for forming a spiral flow of air in each of the small sized cyclones 310.

Each of the spiral guides 340 includes a guide body 341 around the air discharge pipe 330 having an opening in one side of ah outside circumference, and a tangential guide 342 extended from one side edge of the opening in a tangential direction for forming a spiral flow in the small sized cyclone 310.

It is preferable that it is air tight between the guide body 341, and the secondary air outlet 320. For this, it is preferable that a bottom end of the guide body 341 is in close contact with a circumference of the secondary air outlet 320 without a gap.

Of course, the spiral guide 340 may be formed as one body with the primary cyclone unit 200.

It is preferable that the primary cyclone unit 200 and the secondary cyclone unit 300 are formed as a unit.

The primary cyclone unit 200 and the secondary cyclone unit 300 are fastened to the upper cover 111*b* of the dust container with screw, or the like, and detachable from the dust container body 111*a* together with the upper cover 111*b*.

The operation of the vacuum cleaner having the dust collecting device 100 of the present invention applied thereto will be described.

Upon putting the vacuum cleaner into operation, the external contaminated air is drawn to the suction flow passage of the cleaner body through the suction nozzle and the connection pipe, and circulates in a spiral in the primary cyclone container 210.

According to this, of particles of the dust circulating in a spiral in the primary cyclone container 210, comparatively heavy, and large particles of the dust are discharged to the primary dust container 111 through the primary dust outlet 220 by centrifugal force and stored at a lower portion of the primary dust container.

The air cleaned primarily as the comparatively large dust particles are separated is discharged to an upper side of the upper cover 111*b* through the air discharge member 250 and the primary air outlet, introduced to an inside of the small sized cyclones 310 guided by the guide member 113*a* and the spiral guide 340, and circulates in a spiral.

According to this, comparatively light particles of the dust are separated in the small sized cyclones 310, and stored in the secondary dust container 112.

The air cleaned again, by the small sized cyclones 310 is discharged to an upper side of the cap 113 through the air discharge pipe 330, passes a predetermined air discharge flow passage in the cleaner body and the motor-fan assembly, and is discharged to an outside of the cleaner body.

In the meantime, the dust collecting device of the present invention is applicable both to the canister type vacuum cleaner, and the upright type vacuum cleaner.

It will be apparent to those skilled in the art that various modifications and variations can be made in the present invention without departing from the spirit or scope of the inventions.

Thus, it is intended that the present invention covers the modifications and variations of this invention provided they come within the scope of the appended claims and their equivalents.

INDUSTRIAL APPLICABILITY

The dust collecting device of the present invention having the foregoing design has the following advantages.

First, the provision of the secondary dust container, which stores dust separated at the secondary cyclone unit, in the primary dust container, which stores dust separated at the primary cyclone unit, permits to maximize a dust collecting capacity of the primary dust container, and to clean the secondary dust container easily.

Second, the formation of the primary dust outlet in the outside circumferential surface of the primary cyclone container for discharging the dust to the primary dust container by centrifugal force, minimizing the dust laden on a discharge air flow from the primary cyclone container, a dust separation performance of the primary cyclone unit is improved.

Third the outside wall of the dust container body, which is an outside wall of the primary dust container, formed of a material which can see-through permits easy checking of a dust amount in the primary dust container which stores most of the dust, thereby permitting to select a time for emptying the dust container, appropriately.

Fourth, the small sized cyclones in the secondary cyclone unit mounted tilted toward an inside of the dust container as it goes toward a lower side the more permits to maximize a volume of the primary dust container.

Fifth, the arrangement of the small sized cyclones along an outside circumference of the primary cyclone unit permits the dust collecting device compact on the whole.

The invention claimed is:

1. A dust collecting device for a vacuum cleaner comprising:

a primary cyclone unit for separating dust by a cyclone principle;

a secondary cyclone unit around the primary cyclone unit for separating dust from air discharged from the primary cyclone unit by the cyclone principle;

a primary dust container for storing the dust separated at the primary cyclone unit; and a secondary dust container in the primary dust container for storing the dust separated at the secondary cyclone unit.

2. The dust collecting device as claimed in claim 1, wherein the primary cyclone unit includes;

a primary cyclone container having a bottom end sectional area smaller than a top end sectional area, along an inside circumferential surface of which spiral circulation is formed, and a primary dust outlet in the primary cyclone container for discharging the dust to the primary dust container.

3. The dust collecting device as claimed in claim 2, wherein the primary cyclone container has a cross sectional area which becomes the smaller as it goes toward a bottom end the more.

4. The dust collecting device as claimed in claim 2, wherein the primary dust outlet is formed passed through a circumferential wall of the primary cyclone container, for discharging the dust from the primary cyclone container to the primary dust container by centrifugal force.

5. The dust collecting device as claimed in claim 3, wherein the primary dust outlet is extended from a top end to a bottom end of the primary cyclone container in an up/down direction.

6. The dust collecting device as claimed in claim 2, wherein the secondary cyclone unit includes a plurality of small sized cyclones arranged in a circumferential direction on an outer circumference of the primary cyclone container.

7. The dust collecting device as claimed in claim 6, wherein the small sized cyclones are arranged such that a space between bottom ends is smaller than a space between top ends.

8. The dust collecting device as claimed in claim 7, wherein the small sized cyclones are provided tilted on the outer side of the primary cyclone container such that a radius of a circle connecting top centers of the small sized cyclones is greater than a radius of a circle connecting bottom centers of the small sized cyclones.

9. The dust collecting device as claimed in claim 7, wherein each of the small sized cyclones includes;

a cylindrical body, and a supplementary body under the body, having a cross sectional area which becomes the smaller as it goes toward a bottom end the more.

10. The dust collecting device as claimed in claim 9, wherein the primary cyclone container has a cup shape with a cross sectional area which becomes the smaller gradually as it goes toward a bottom end the more, and outside circumferential surfaces of the body and the supplementary body are in contact with an outside circumferential surface of the primary cyclone container such that the supplementary body, is bent toward the primary cyclone, container with respect to the body.

11. The dust collecting device as claimed in claim 7, wherein the primary dust container surrounds the secondary cyclone unit.

12. The dust collecting device as claimed in claim 11, wherein the secondary dust container is connected to the bottom ends of the small sized cyclones, provided to a lower center of the primary dust container, and has a dust inlet at a top circumference thereof for receiving dust separated at the small sized cyclones.

13. The dust collecting device as claimed in claim 12, wherein the primary dust container is formed as one body with a bottom of the secondary dust container, and includes an openable bottom.

14. The dust collecting device as claimed in claim 1, wherein the secondary cyclone unit and the primary cyclone unit are formed as one body.

15. The dust collecting device as claimed in claim 14, wherein the primary dust container is openably provided to a top end of an outside wall of the primary dust container, and includes an upper cover to which the secondary cyclone unit and the primary cyclone unit are connected.

* * * * *